(12) United States Patent
Perry et al.

(10) Patent No.: US 7,813,555 B1
(45) Date of Patent: Oct. 12, 2010

(54) METHOD FOR GENERATING A DISTANCE FIELD OF AN OBJECT REPRESENTED BY OUTLINES

(75) Inventors: Ronald N. Perry, Cambridge, MA (US); Sarah F. Frisken, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 12/414,694

(22) Filed: Mar. 31, 2009

(51) Int. Cl.
*G06T 11/00* (2006.01)
(52) U.S. Cl. .................... 382/199; 345/468; 345/469.1
(58) Field of Classification Search ............... 345/469.1
See application file for complete search history.

(56) References Cited

U.S. PATENT DOCUMENTS

| | | | |
|---|---|---|---|
| 5,828,380 A * | 10/1998 | Lin | 345/441 |
| 5,867,173 A * | 2/1999 | Ballard et al. | 345/468 |
| 6,396,492 B1 | 5/2002 | Frisken et al. | |
| 6,917,369 B2 | 7/2005 | Perry et al. | |
| 7,034,845 B2 | 4/2006 | Perry et al. | |
| 7,123,271 B2 | 10/2006 | Perry et al. | |
| 2002/0097912 A1 * | 7/2002 | Kimmel et al. | 382/199 |
| 2004/0193389 A1 * | 9/2004 | Perry et al. | 703/2 |

OTHER PUBLICATIONS

Sarah F. Frisken et al., Adaptively Sampled Distance Fields: A General Representation of Shape for Computer Graphics, Mitsubishi Research Laboratories, Dec. 2000, 8 pages.*
Elena J, Jakubiak et al., "An Improved Repesentation for Stroke-Based Fonts" SIGGRAPH 2006 Conference Abstrats and Applications.

\* cited by examiner

*Primary Examiner*—Brian P Werner
(74) *Attorney, Agent, or Firm*—Dirk Brinkman; Gene Vinokur

(57) ABSTRACT

A method generates a distance field of an object, where the distance field includes a set of cells and the object includes a set of outlines. A processor is included for performing steps of the method. A first cell of the set of cells enclosing the object is determined. An outside reconstruction method is associated with the first cell. A set of boundary cells of the set of cells is determined, where each boundary cell encloses a portion of a particular outline in the set of outlines. A boundary reconstruction method is associated with each boundary cell. A final cell of the set of cells is determined enclosing the object. An inside reconstruction method is associated with the final cell. The outside and boundary reconstruction methods are used to determine combined distances, which are further processed by the inside reconstruction method to generate the distance field of the object.

2 Claims, 2 Drawing Sheets

METHOD FOR GENERATING A DISTANCE FIELD OF AN OBJECT REPRESENTED BY OUTLINES

FIELD OF INVENTION

The invention relates generally to generating distance fields, and more particularly to generating distance fields of objects represented by outlines.

BACKGROUND OF THE INVENTION

In the field of computer graphics, the rendering of two-dimensional objects is of fundamental importance. Two-dimensional objects, such as character shapes, corporate logos, and elements of an illustration contained in a document, are rendered as static images or as a sequence of frames comprising an animation. There are numerous representations for two-dimensional objects and it is often the case that one representation is better than another representation for specific operations such as rendering and editing. In these cases, a conversion from one form to another is performed.

Distance fields have proven to be an effective representation for rendering and editing two-dimensional shapes, as demonstrated by the following patents, all incorporated herein by reference: U.S. Pat. No. 6,396,492, issued May 28, 2002, entitled "Detail-directed hierarchical distance fields;" U.S. Pat. No. 7,034,845, issued Mar. 13, 2007, entitled "Antialiasing an Object Represented as a Two-Dimensional Distance Field in Image-Order;" U.S. Pat. No. 7,123,271, issued Oct. 17, 2006, entitled "Antialiasing a Set of Objects Represented as a Set of 2D Distance Fields in Image-Order;" and U.S. Pat. No. 6,917,369, issued Jul. 12, 2005, entitled "Method and Apparatus for Rendering Cell-based Distance Fields using Texture Mapping."

Although we focus here on digital type, possibly the most common and important two-dimensional object, the following discussion applies to all types of two-dimensional objects.

We begin with some basic background on digital type. A typical Latin font family, such as Times New Roman or Arial, includes a set of fonts, e.g., regular, italic, bold, and bold italic. Each font includes a set of individual character shapes called glyphs. Each glyph is distinguished by its various design features, such as underlying geometry, stroke thickness, serifs, joinery, placement and number of contours, and ratio of thin-to-thick strokes.

There are a number of ways to represent fonts, including outlines, uniform width strokes, and stylized strokes.

Outline-based representations have been adopted and popularized by Bitstream Inc. of Cambridge, Mass., Adobe Systems, Inc. of Mountain View, Calif., Apple Computer, Inc., of Cupertino, Calif., Microsoft Corporation of Bellevue, Wash., URW of Hamburg, Germany, and Agfa Compugraphic of Wilmington, Mass.

To optimize memory usage, uniform width stroke fonts can be used. These fonts typically group sets of uniform width strokes, a.k.a. radicals or graphemes, which are commonly repeated in Chinese characters throughout a font, as a single simple shape that is then reused across characters.

Stylized Stroke Fonts (SSFs) are enhanced stroke-based fonts whose strokes have variable thickness and stylistic stroke ends, see "An Improved Representation for Stroke-based Fonts", SIGGRAPH 2006 Conference Abstracts and Applications, Elena J. Jakubiak, Ronald N. Perry, and Sarah F. Frisken.

SSFs are also described in U.S. Non-Provisional patent application Ser. No. 12/359,819 "Method for Converting Outline Characters to Stylized Stroke Characters," filed by Jakubiak et al. on Jan. 26, 2009, incorporated herein by reference.

SSFs employ a modular structure that leverages the repetition of shape within a font, enabling SSFs to match the expressiveness of outline fonts with a memory footprint comparable to current uniform width stroke fonts.

To enable the use of distance-based rendering, see, for example, U.S. Pat. No. 6,917,369 "Method and Apparatus for Rendering Cell-based Distance Fields using Texture Mapping," incorporated herein by reference, as well as other operations such as editing, space and time efficient methods are required for generating a distance field of an object, such as a glyph, represented by various forms.

It is an object of the invention to provide a space and time efficient method for generating a distance field of an object represented by outlines.

SUMMARY OF THE INVENTION

A method generates a distance field of an object, where the distance field includes a set of cells and the object includes a set of outlines. A processor is included for performing steps of the method.

A first cell of the set of cells enclosing the object is determined. A distance value for a point outside the object is specified, where the distance value for the point outside the object is negative. An outside reconstruction method is associated with the first cell, where the outside reconstruction method evaluates, for each point inside the first cell, to the specified distance value for the point outside the object.

A set of boundary cells of the set of cells is determined, where each boundary cell encloses a portion of a particular outline in the set of outlines. A boundary reconstruction method is associated with each boundary cell, where the boundary reconstruction method evaluates a distance, for each point inside the boundary cell, as a negated unsigned minimum distance from the point to the enclosed portion of the particular outline.

A final cell of the set of cells is determined enclosing the object. An inside reconstruction method is associated with the final cell, where the inside reconstruction method distinguishes between points inside the set of outlines and points outside the set of outlines.

A combined distance is determined for each point inside the first cell by determining a first distance value of the first cell using the outside reconstruction method, determining, for each boundary cell, a boundary distance value of the boundary cell using the boundary reconstruction method, and selecting a maximum distance value from the first distance value of the first cell and the boundary distance values of the boundary cells to determine the combined distance for the point inside the first cell.

A sign of the combined distance is inverted for each point inside the set of outlines using the inside reconstruction method of the final cell to generate the distance field of the object.

DETAILED DESCRIPTION OF THE PREFERRED EMBODIMENT

Figure 1:
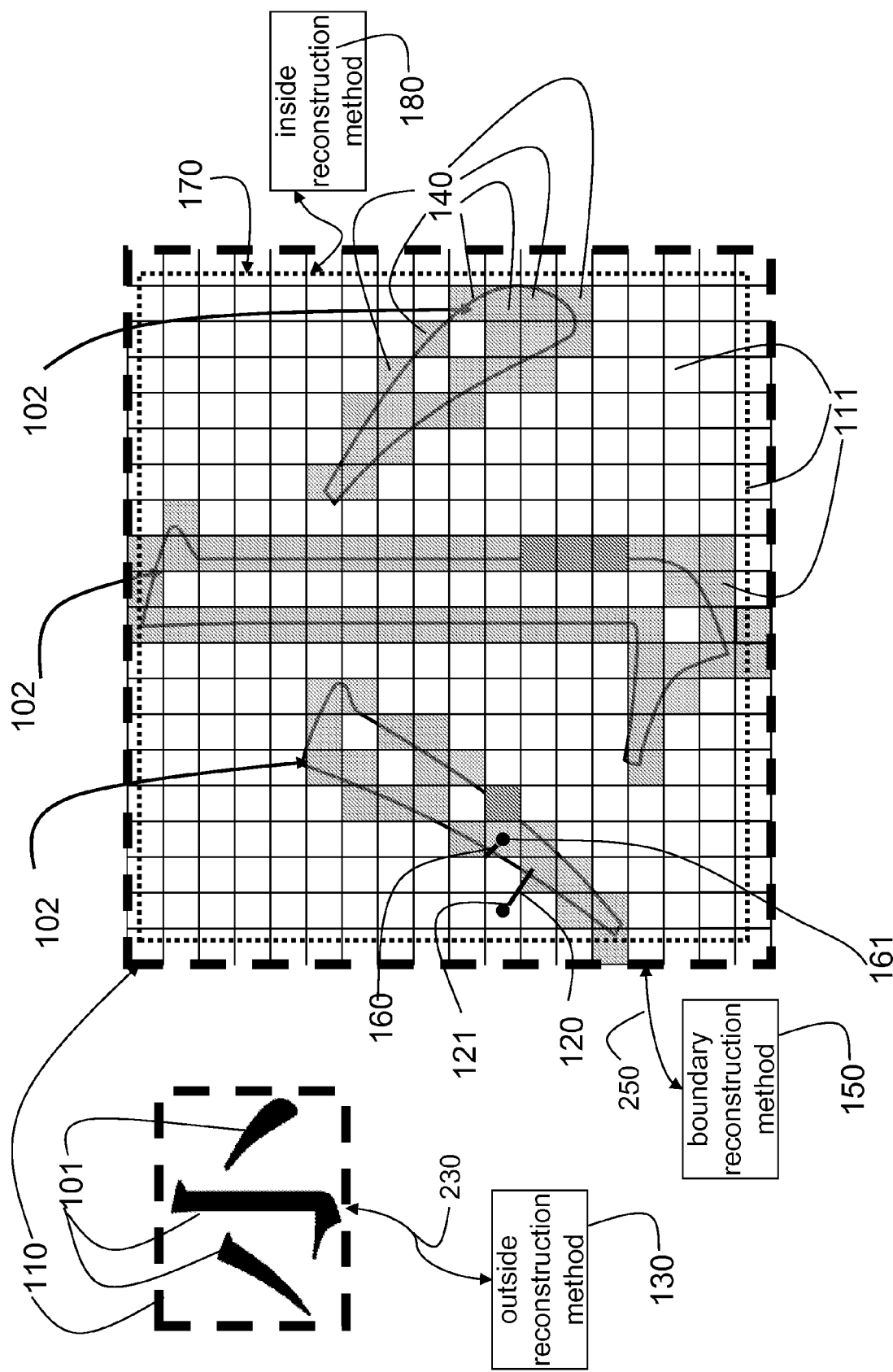
FIG. 1 is a diagram of an object, described by a set of outlines around the object, whose distance field is generated and rendered according to embodiments of the invention.

FIG. 1 shows an object 101, described by a set of outlines 102 around the object, whose distance field is generated and rendered according to embodiments of the invention.

Figure 2:
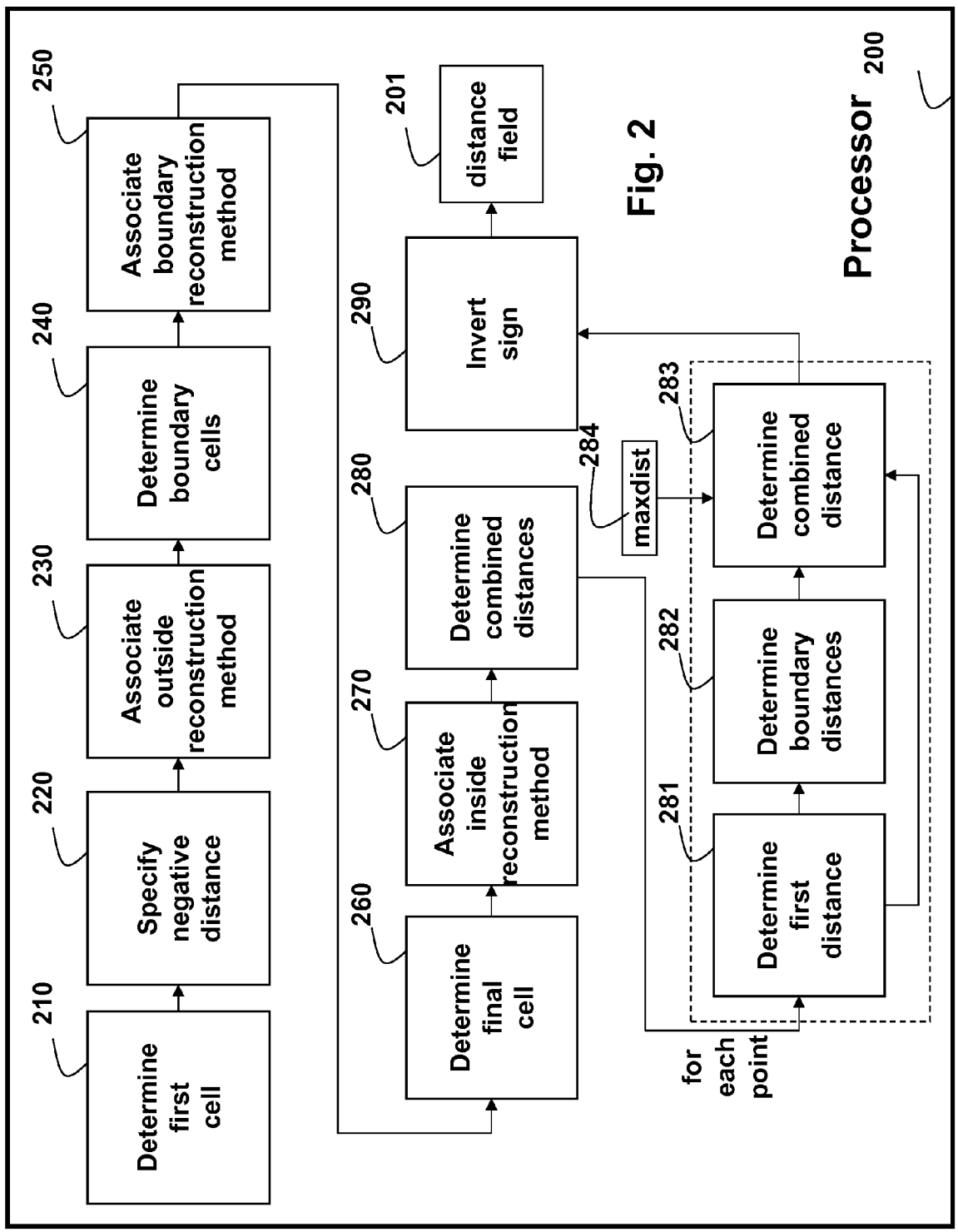
FIG. 2 is a flow diagram of a method for generating the distance field of the object of FIG. 1 according to embodiments of the invention.

FIG. 2 shows a method for generating a distance field 201 of the object 101 according to embodiments of the invention. The method can be performed by a processor 200.

The method generates the distance field 201 of the object 101 from the set of outlines 102. The distance field 201 includes a set of cells, and the object includes the set of outlines 102.

A first cell 110 enclosing the object 101 is determined 210, wherein the first cell includes a set of cells 111. A distance value 120 for a point 121 outside the object 101 is specified 220. The distance value 120 for the point 121 outside the object 101 is negative. An outside reconstruction method 130 is associated 230 with the first cell 101. The outside reconstruction method 130 evaluates, for each point 121 inside the first cell 101, to the specified distance value 120 for the point 121 outside the object 101.

A set of boundary cells 140 of the set of cells is determined 240. Each boundary cell 140 encloses a portion of a particular outline in the set of outlines 102. A boundary reconstruction method 150 is associated 250 with each boundary cell. The boundary reconstruction method 150 evaluates a distance 160, for each point 161 inside the boundary cell, as a negated unsigned minimum distance from the point to the enclosed portion of the particular outline.

A final cell 170 of the set of cells enclosing the object is determined 260, and an inside reconstruction method 180 is associated 270 with the final cell 170. The inside reconstruction method 180 distinguishes between points 161 inside the set of outlines 102 and points 121 outside the set of outlines 102.

For each point inside the first cell 110, a combined distance is determined 280. The determining 280 includes the following steps:

A first distance value of the first cell 101 is determined 281 using the outside reconstruction method 130. For each boundary cell 140, a boundary distance value 160 of the boundary cell 140 is determined 282 using the boundary reconstruction method 150, and a maximum distance (maxdist) 284 value is selected 283 from the first distance value of the first cell 101 and the boundary distance values 161 of the boundary cells 140 to determine the combined distance for the point inside the first cell 101.

Then, a sign of the combined distance for each point inside the set of outlines is inverted 290 using the inside reconstruction method of the final cell to generate the distance field 201 of the object 101.

Once the distance field 201 of the object 101 is generated, the distance field 201 can be rendered to a display device for viewing the object 101. The distance field 201 can be rendered using various prior art methods such as U.S. Pat. No. 6,917,369 "Method and Apparatus for Rendering Cell-based Distance Fields using Texture Mapping."

It should be noted that a different sign convention can be used to distinguish between points inside and points outside the object 101. For example, the specified distance value for the point outside the object 101 can be positive rather than negative as described above.

Operating Environment

The invention is operational with numerous general purpose or special purpose computing system environments or configurations. Examples of well known computing systems, environments, and/or configurations that are suitable for use with the invention include, but are not limited to, personal computers, server computers, handheld or laptop devices, multiprocessor or multi-core systems, graphics processing units (GPUs), application-specific integrated circuits (ASICs), field programmable gate arrays (FPGAs), microcontroller-based systems, set top boxes, programmable consumer electronics, network PCs, minicomputers, mainframe computers, distributed computing environments that include any of the above systems or devices, and the like, i.e., generally processors. A monitor or other type of display device is connected to any of the above systems to enable the rendering of the distance field 201 of the object 101 generated according to embodiments of the invention.

As can be seen above, there are numerous opportunities for operating the invention in parallel. For example, the outside reconstruction method, the boundary reconstruction methods, and the inside reconstruction method contain no dependencies between each other and therefore can exploit hardware and multi-core implementations of the invention to improve performance of the generation of the distance field 201 of the object 101. As another example, the determination 282 of the boundary distance values for a particular boundary cell contains no inter-dependencies, thereby allowing the boundary distance values to be determined 282 for the particular boundary cell in parallel.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for generating a distance field of an object, the distance field including a set of cells, the object including a set of outlines, the method comprising the steps of:

determining a first cell of the set of cells, wherein the first cell encloses the object;

specifying a distance value for a point outside the object, wherein the distance value for the point outside the object is negative;

associating an outside reconstruction method with the first cell, wherein the outside reconstruction method when evaluated, for each point inside the first cell, produces the distance value for the point outside the object, wherein the distance value for the point outside the object is negative;

determining a set of boundary cells of the set of cells, wherein each boundary cell encloses a portion of a particular outline in the set of outlines;

associating, with each boundary cell, a boundary reconstruction method, wherein the boundary reconstruction method when evaluated produces a distance, for each point inside the boundary cell, as a negated unsigned minimum distance from the point to the enclosed portion of the particular outline;

determining a final cell of the set of cells enclosing the object;

associating an inside reconstruction method with the final cell, wherein the inside reconstruction method distinguishes between points inside the set of outlines and points outside the set of outlines;

determining, for each point inside the first cell, a combined distance, wherein the determining further comprises the steps of:

determining a first distance value of the first cell by evaluating the outside reconstruction method;

determining, for each boundary cell, a boundary distance value of the boundary cell by evaluating the boundary reconstruction method; and selecting a maximum distance value from the first distance value of the first cell and the boundary distance values of the boundary cells to determine the combined distance for the point inside the first cell; and inverting a sign of the combined distance for each point inside the set of outlines using the inside reconstruction method of the final cell to generate the distance field of the object, wherein the steps are performed in a processor.

2. The method of claim 1, further comprising:

rendering the distance field.

* * * * *